United States Patent
Kaneko et al.

(10) Patent No.: US 12,149,503 B2
(45) Date of Patent: Nov. 19, 2024

(54) GATEWAY DEVICE

(71) Applicant: HITACHI ASTEMO, LTD., Hitachinaka (JP)

(72) Inventors: Shuhei Kaneko, Hitachinaka (JP); Hiroki Yamazaki, Hitachinaka (JP); Teruaki Nomura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 183 days.

(21) Appl. No.: 17/609,140

(22) PCT Filed: Jul. 7, 2020

(86) PCT No.: PCT/JP2020/026519
§ 371 (c)(1),
(2) Date: Nov. 5, 2021

(87) PCT Pub. No.: WO2021/010223
PCT Pub. Date: Jan. 21, 2021

(65) Prior Publication Data
US 2022/0224672 A1 Jul. 14, 2022

(30) Foreign Application Priority Data
Jul. 12, 2019 (JP) ................. 2019-129921

(51) Int. Cl.
*H04L 9/40* (2022.01)
*H04L 12/66* (2006.01)

(52) U.S. Cl.
CPC .......... *H04L 63/0227* (2013.01); *H04L 12/66* (2013.01); *H04L 63/1408* (2013.01)

(58) Field of Classification Search
CPC .............. H04L 63/02–029; H04L 63/14–1491
See application file for complete search history.

(56) References Cited

U.S. PATENT DOCUMENTS

| | | | |
|---|---|---|---|
| 10,897,469 B2 * | 1/2021 | Hirshberg | ............... G06F 15/16 |
| 2005/0193429 A1 * | 9/2005 | Demopoulos | ....... H04L 63/0263 |
| | | | 713/188 |

(Continued)

FOREIGN PATENT DOCUMENTS

| | | | | |
|---|---|---|---|---|
| EP | 3297232 A1 * | 3/2018 | ........... | G06Q 30/016 |
| JP | 2003-528484 A | 9/2003 | | |

(Continued)

OTHER PUBLICATIONS

International Search Report with English translation and Written Opinion issued in corresponding application No. PCT/JP2020/026519 dated Nov. 10, 2020.

*Primary Examiner* — Madhuri R Herzog
(74) *Attorney, Agent, or Firm* — Foley & Lardner LLP

(57) ABSTRACT

Provided is a gateway device capable of reducing influence on intra-vehicle network communication from a cyber security attack that infringes availability represented by a DoS attack from an extra-vehicle network. Included are: an external-network-side transfer processing unit that transfers a communication frame received from an external network to an internal network; an internal-network-side transfer processing unit that transfers the communication frame transferred from the external network via the external-network-side transfer processing unit to the internal network; a transfer notification unit that gives a transfer notification to notify transfer of the communication frame from the external-network-side transfer processing unit to the internal-network-side transfer processing unit; and a monitoring unit that determines whether to transfer the communication frame based on at least one of a frequency of the transfer notification to the internal-network-side transfer processing unit and a transfer data amount of the commu- (Continued)

nication frame transferred from the external-network-side transfer processing unit.

5 Claims, 9 Drawing Sheets

(56) References Cited

U.S. PATENT DOCUMENTS

| | | |
|---|---|---|
| 2007/0067837 A1 | 3/2007 | Schuster |
| 2008/0195732 A1* | 8/2008 | Maruyama .............. H04L 43/16 709/224 |
| 2015/0372975 A1 | 12/2015 | Moriya et al. |

FOREIGN PATENT DOCUMENTS

| | | | |
|---|---|---|---|
| JP | 2005039591 A | * | 2/2005 |
| JP | 2012-10022 A | | 1/2012 |
| JP | 2013179539 A | * | 9/2013 |
| JP | 2014-165641 A | | 9/2014 |
| JP | 2018-142197 | | 9/2018 |

* cited by examiner

GATEWAY DEVICE

TECHNICAL FIELD

The present invention relates to a gateway device.

BACKGROUND ART

A plurality of electronic control units (ECUs) are mounted on a vehicle and installed at various places in the vehicle. The plurality of ECUs cooperate to implement one application. Therefore, the ECUs are connected by a communication line to form a network, thereby performing data communication among the ECUs.

Since these ECUs are installed at various places in the vehicle, communication between different networks configured for each installation place is relayed by an on-vehicle gateway device to form one on-vehicle network. As a communication protocol of the on-vehicle network, a control area network (CAN) has been widely used.

In addition, the development of connected cars has rapidly progressed. Since an engine or a key lock can be remotely operated in a connected car connected to an extra-vehicle network, security problems, such as takeover of a driving operation by a third party such as hacking and leakage of vehicle information, have become major problems.

As a technology related to communication between different networks, for example, PTL 1 discloses a method for secure data exchange between external and internal networks via a transaction interface, in which an external user can undertake predetermined data transactions within the internal network. In the method for secure data exchange, the transaction interface is provided in a format of including: a portal of the external network, a neutral zone connected at the downstream side as viewed in an access direction and having at least one interface server and an interface storage device; and an internal server that is disposed in advance in the internal network. In the method for secure data exchange, a query of the external user and a data transaction in the internal network are processed by the interface server and temporarily stored in the interface storage device in a predetermined form, and complete processing including user authentication takes place within the internal network.

CITATION LIST

Patent Literature

PTL 1: JP 2003-528484 A

SUMMARY OF INVENTION

Technical Problem

In the related art described above, however, it is unclear whether communication safety can be ensured against a cyber security attack that infringes availability represented by a Denial of Service (DoS) attack from the external network.

The present invention has been made in view of the above, and an object thereof is to provide a gateway device capable of reducing influence on intra-vehicle network communication from a cyber security attack that infringes availability represented by a DoS attack from an extra-vehicle network.

Solution to Problem

The present application includes a plurality of means for solving the above problem, and an example thereof is a gateway device that performs communication connection between an internal network of a device and an external network. The gateway device includes: an external-network-side transfer processing unit that transfers a communication frame received from the external network to the internal network; an internal-network-side transfer processing unit that transfers the communication frame transferred from the external network via the external-network-side transfer processing unit to the internal network; a transfer notification unit that gives a transfer notification to notify transfer of the communication frame from the external-network-side transfer processing unit to the internal-network-side transfer processing unit; a firewall unit that filters at least one of the communication frame transferred from the external network to the external-network-side transfer processing unit and the communication frame transferred from the internal-network-side transfer processing unit to the internal network; and a monitoring unit that determines whether to transfer the communication frame based on at least one of a frequency of the transfer notification from the transfer notification unit to the internal-network-side transfer processing unit and a transfer data amount of the communication frame transferred between the external-network-side transfer processing unit and the internal-network-side transfer processing unit.

Advantageous Effects of Invention

According to the present invention, it is possible to reduce the influence on the intra-vehicle network communication from the cyber security attack that infringes the availability represented by the DoS attack from the extra-vehicle network.

DESCRIPTION OF EMBODIMENTS

Hereinafter, embodiments of the present invention will be described with reference to the drawings.

First Embodiment

A first embodiment of the present invention will be described with reference to FIGS. 1 to 3.

Figure 1:
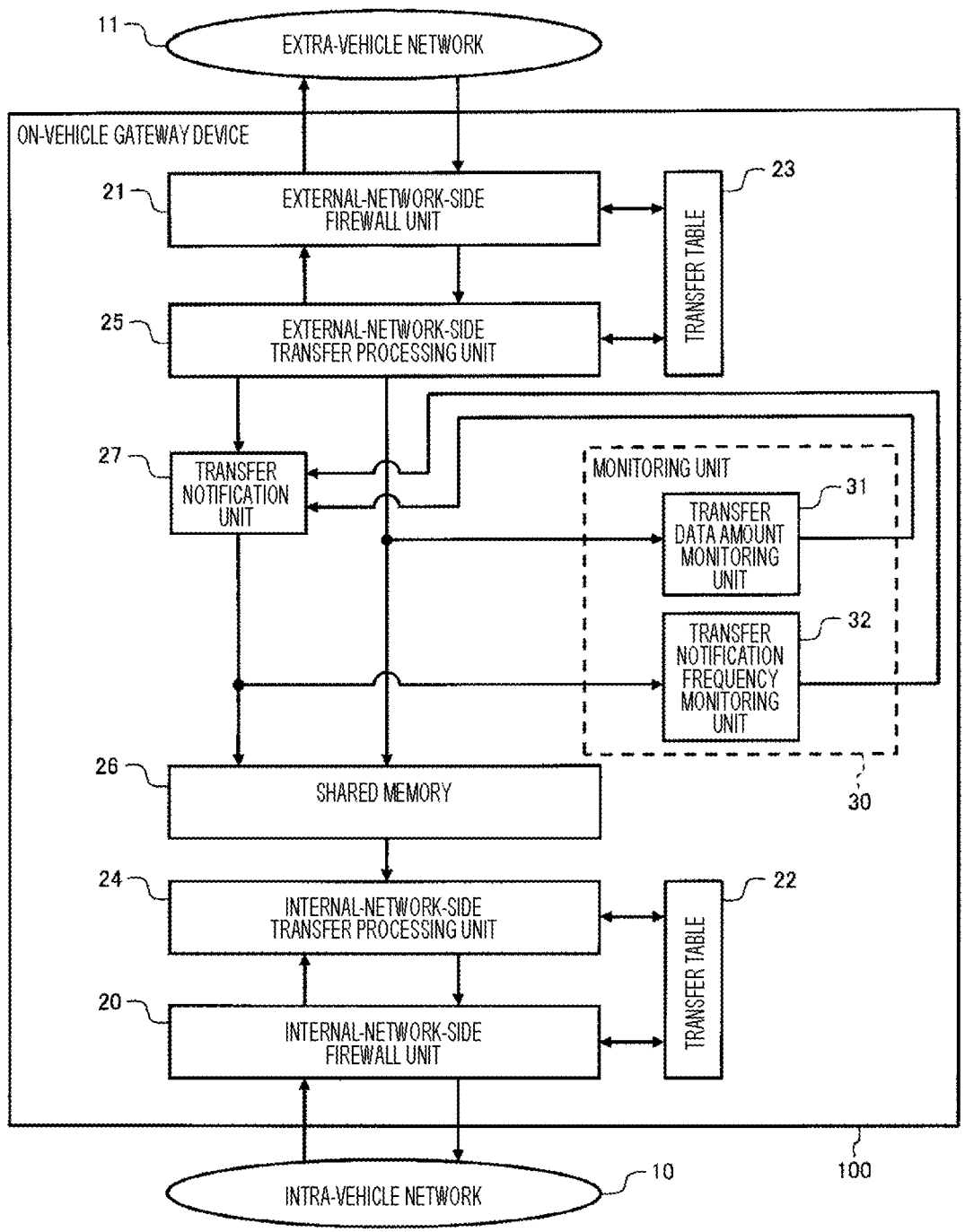
FIG. 1 is a functional block diagram schematically illustrating functions of an on-vehicle gateway device according to a first embodiment.

FIG. 1 is a functional block diagram schematically illustrating functions of an on-vehicle gateway device according to the present embodiment.

In FIG. 1, an on-vehicle gateway device 100 is configured to perform communication connection between an intra-vehicle network 10 (internal network) of a device mounted on a vehicle and an extra-vehicle network 11 (external network), and includes: an external-network-side firewall unit 21 that determines whether a communication frame to be exchanged with the extra-vehicle network 11 is a communication frame to be transmitted or received to or from the extra-vehicle network 11, that is, a communication frame to be passed, based on identification information included in the communication frame and a predetermined transfer table 22, and performs processing to allow passage only when the communication frame is determined to be the communication frame to be transmitted or received; an external-network-side transfer processing unit that transfers a communication frame, which has passed through the external-network-side firewall unit 21 from the extra-vehicle network 11, to a predetermined transfer destination based on identification information included in the communication frame and the transfer table 22; an internal-network-side firewall unit 20 that determines whether a communication frame to be exchanged with the intra-vehicle network 10 is a communication frame to be transmitted or received to or from the intra-vehicle network 10, that is, a communication frame to be passed, based on identification information included in the communication frame and a predetermined transfer table 23, and performs processing to allow passage only when the communication frame is determined to be the communication frame to be transmitted or received; an internal-network-side transfer processing unit 24 that transfers a communication frame, which has passed through the internal-network-side firewall unit 20 from the intra-vehicle network 10, to a predetermined transfer destination based on identification information included in the communication frame and the transfer table 23; a shared memory 26 that temporarily stores a communication frame transferred from the external-network-side transfer processing unit 25 to the internal-network-side transfer processing unit 24; a transfer notification unit 27 that gives a transfer notification to notify the shared memory 26 that there is a communication frame transferred from the external-network-side transfer processing unit 25 to the shared memory 26 based on information from the external-network-side transfer processing unit 25; and a monitoring unit 30 that determines whether to transfer a communication frame from the external-network-side transfer processing unit 25 to the internal-network-side transfer processing unit 24 via the shared memory 26 based on at least one of a frequency of the transfer notification from the transfer notification unit 27 to the shared memory 26 and a data amount of the communication frame transferred from the external-network-side transfer processing unit 25 to the shared memory 26.

The monitoring unit 30 includes a transfer data amount monitoring unit 31 that monitors the data amount of the communication frame transferred from the external-network-side transfer processing unit 25 to the shared memory 26 and stored, and a transfer notification frequency monitoring unit 32 that monitors the frequency of the transfer notification from the transfer notification unit 27 to the shared memory 26.

When the amount of data per unit time (predetermined fixed period) transferred to the shared memory 26 is more than a predetermined threshold, the transfer data amount monitoring unit 31 outputs an instruction for prohibiting the transfer notification to the shared memory 26 (transfer notification prohibition instruction) to the transfer notification unit 27. Further, when the amount of data per unit time transferred to the shared memory 26 is equal to or less than the predetermined threshold, an instruction for permitting the transfer notification to the shared memory 26 (transfer notification permission instruction) is output to the transfer notification unit 27.

When the frequency of the transfer notification is more than a predetermined threshold, the transfer notification frequency monitoring unit 32 outputs the instruction for prohibiting the transfer notification to the shared memory 26 (transfer notification prohibition instruction) to the transfer notification unit 27. Further, when the frequency of the transfer notification is equal to or less than the predetermined threshold, the instruction for permitting the transfer notification to the shared memory 26 (transfer notification permission instruction) is output to the transfer notification unit 27.

When receiving the transfer notification prohibition instruction from at least one of the transfer data amount monitoring unit 31 and the transfer notification frequency monitoring unit 32, the transfer notification unit 27 stops the transfer notification to the shared memory 26. Note that a case where the transfer notification is stopped when the transfer notification prohibition instruction is received from at least one of the transfer data amount monitoring unit 31 and the transfer notification frequency monitoring unit 32 will be described as an example in the present embodiment. However, for example, the transfer notification may be stopped when the transfer notification prohibition instruction is received from both the transfer data amount monitoring unit 31 and the transfer notification frequency monitoring unit 32.

The shared memory 26 temporarily stores a communication frame transferred from the external-network-side transfer processing unit 25, and transfers the communication frame to the internal-network-side transfer processing unit 24 when receiving the transfer notification from the transfer notification unit 27 corresponding to the communication frame. Therefore, when there is no transfer notification from the transfer notification unit 27 to the shared memory 26 (when the transfer notification prohibition instruction is issued), the shared memory 26 does not transfer the temporarily stored communication frame to the internal-network-side transfer processing unit 24 and discards the communication frame. That is, it can be said that the transfer notification prohibition instruction is an instruction for prohibiting the transfer of the communication frame from the external-network-side transfer processing unit 25 to the internal-network-side transfer processing unit 24 via the shared memory 26.

An operation of the present embodiment configured as described above will be described.

Figure 2:
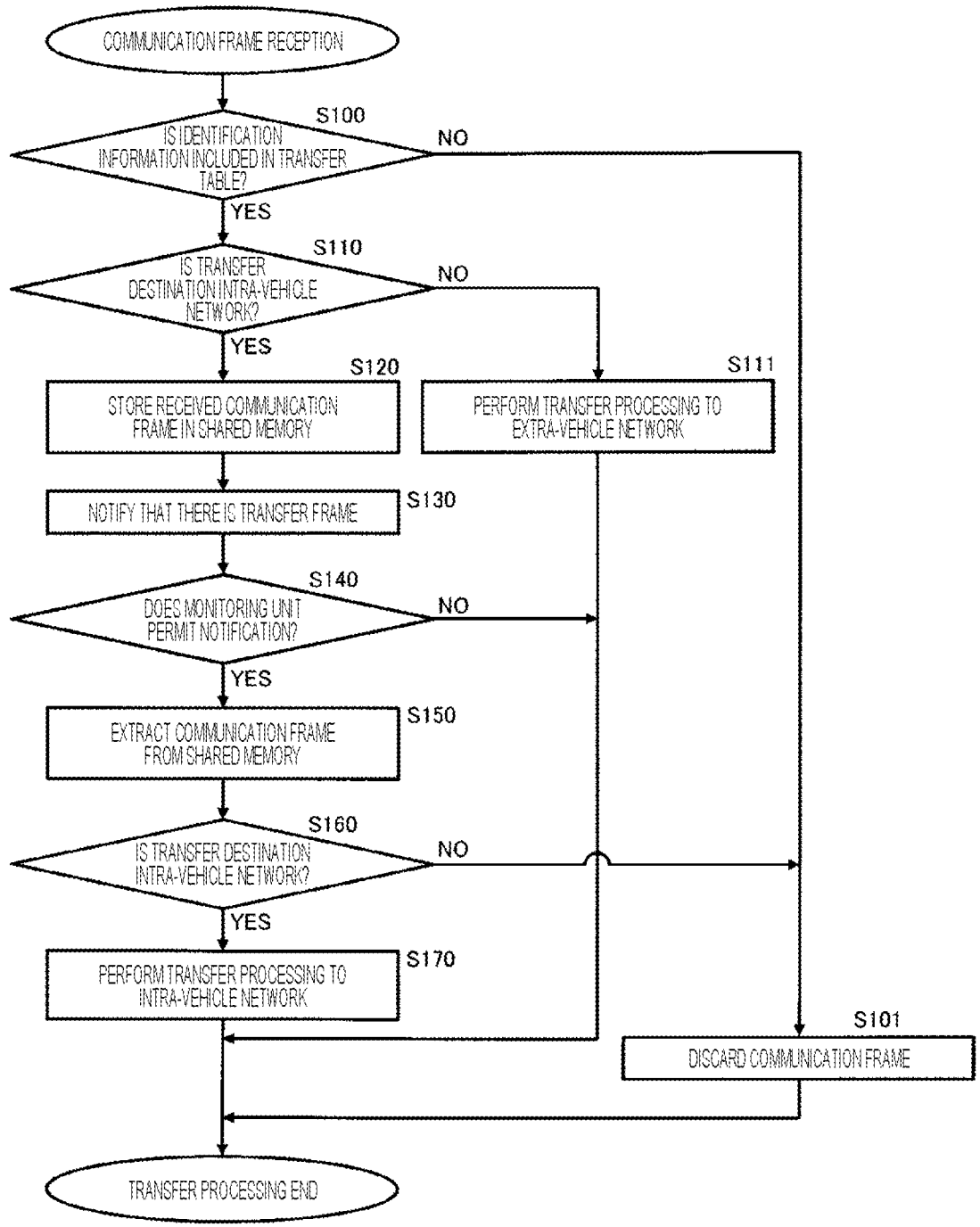
FIG. 2 is a flowchart illustrating a processing content related to transfer processing of the on-vehicle gateway device.

FIG. 2 is a flowchart illustrating a processing content related to transfer processing of the on-vehicle gateway device. Further, FIG. 3 is a flowchart illustrating a processing content related to monitoring processing of the on-vehicle gateway device. Note that a case where a communication frame can pass through the external-network-side firewall unit 21 and the internal-network-side firewall unit 20 will be described as an example in the present embodiment.

First, the transfer processing of the on-vehicle gateway device will be described.

In FIG. 2, when receiving a communication frame addressed to the intra-vehicle network 10 from the extra-vehicle network 11 via the external-network-side firewall unit 21, the external-network-side transfer processing unit 25 of the on-vehicle gateway device collates identification information of the communication frame with information of the transfer table 23, and determines whether the corresponding identification information is included in the transfer table (step S100). If the determination result in step S100 is NO, the communication frame is determined not to be a communication frame to be received and is discarded (step S101), and the transfer processing is ended.

If the determination result in step S100 is YES, it is determined whether a transfer destination defined in the transfer table 23 is the intra-vehicle network 10 (step S110). If the determination result is NO, that is, if the transfer destination is the extra-vehicle network 11, transfer processing to the extra-vehicle network 11 is performed (step S111), and the transfer processing is ended.

If the determination result in step S110 is YES, that is, if the transfer destination is the intra-vehicle network 10, the communication frame is transferred to and stored in the shared memory 26 (step S120), and the transfer notification unit 27 is notified of information indicating that there is a transfer frame stored in the shared memory 26 (step S130).

Subsequently, the transfer notification unit 27 determines whether the transfer notification prohibition instruction has been issued from the monitoring unit 30, that is, whether the transfer notification is permitted (step S140). If the determination result in step S140 is NO, that is, if the transfer notification prohibition instruction has been issued from at least one of the transfer data amount monitoring unit 31 and the transfer notification frequency monitoring unit 32 of the monitoring unit 30, the transfer processing is ended.

If the determination result in step S140 is YES, that is, if the transfer notification permission instruction has been issued from both of the transfer data amount monitoring unit 31 and the transfer notification frequency monitoring unit 32 of the monitoring unit 30, the transfer notification unit 27 gives a transfer notification to the shared memory 26, and the internal-network-side transfer processing unit 24 extracts the communication frame from the shared memory 26 (step S150).

Subsequently, the internal-network-side transfer processing unit 24 collates identification information of the extracted communication frame with the transfer table 22, determines whether a transfer destination defined in the transfer table 22 is the intra-vehicle network 10 (step S160), determines that the communication frame is not a communication frame to be received and discards the communication frame if the determination result is NO (step S101), and ends the transfer processing.

If the determination result in step S160 is YES, that is, if the transfer destination is the intra-vehicle network 10, transfer processing to the intra-vehicle network 10 is performed (step S170), and the transfer processing is ended.

Next, the monitoring processing of the on-vehicle gateway device will be described.

Figure 3:
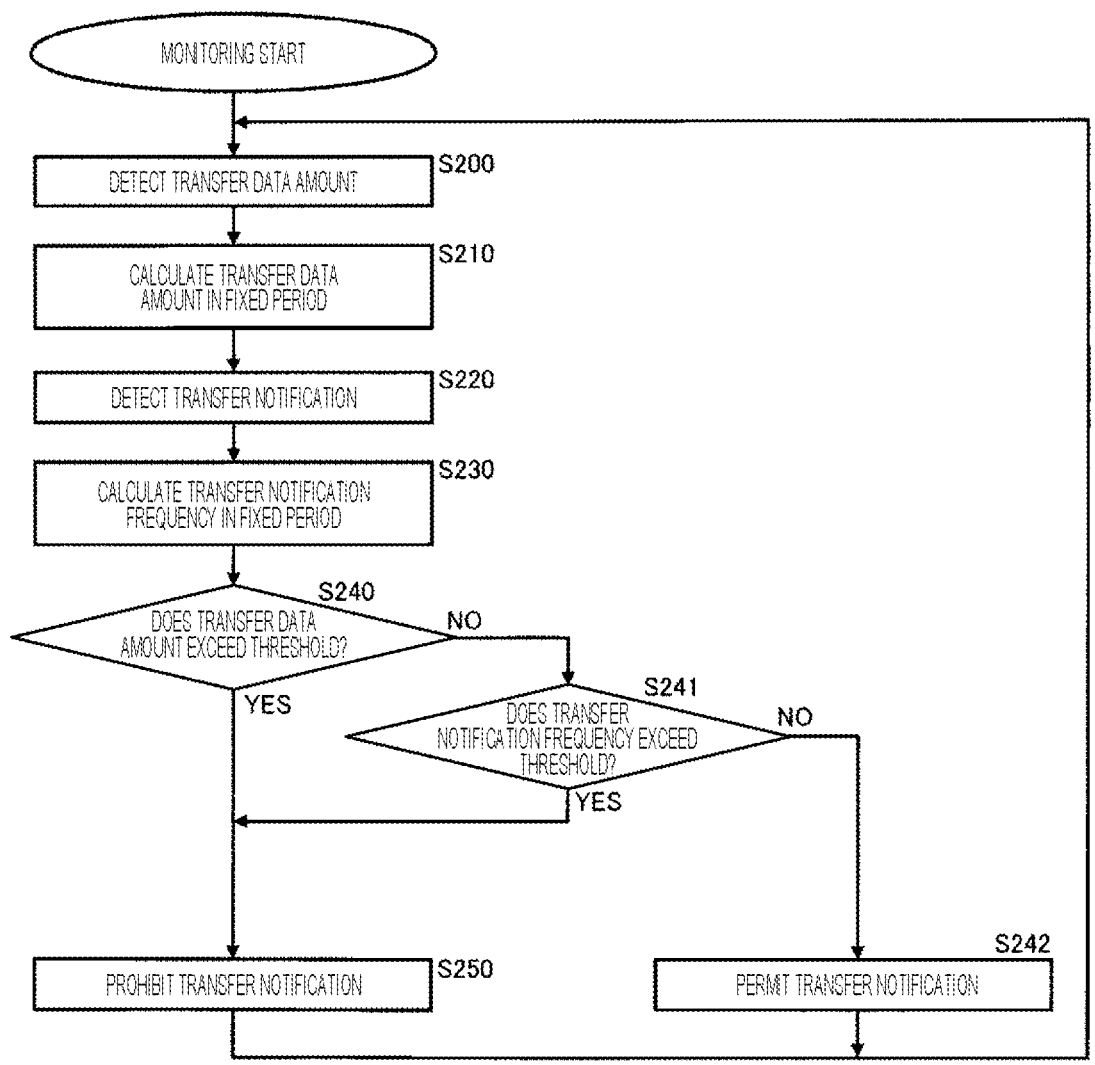
FIG. 3 is a flowchart illustrating a processing content related to monitoring processing of the on-vehicle gateway device.

In FIG. 3, the transfer data amount monitoring unit 31 of the monitoring unit 30 detects a data amount of a communication frame transferred from the external-network-side transfer processing unit 25 to the shared memory 26 and stored (step S200), and calculates a sum or an average value of data amounts of the communication frames transferred in a fixed period (step S210).

Subsequently, the transfer notification frequency monitoring unit 32 of the monitoring unit 30 detects a transfer notification from the transfer notification unit 27 (step S220), and calculates the frequency of the transfer notification in a fixed period (step S230).

Subsequently, the transfer data amount monitoring unit 31 determines whether the calculated sum or average value of transfer data amounts is greater than (exceeds) a predetermined threshold (step S240), outputs the transfer notification prohibition instruction to the transfer notification unit 27 to prohibit the transfer notification (step S250) when the determination result is YES, and returns to the process in step S200 to continue the monitoring processing.

In addition, if the determination result in step S240 is NO, that is, if the calculated sum or average value of transfer data amounts is equal to or less than the predetermined threshold, the transfer notification frequency monitoring unit 32 determines whether the calculated frequency of the transfer notification is greater than (exceeds) a predetermined threshold (step S241), and outputs the transfer notification prohibition instruction to the transfer notification unit 27 to prohibit the transfer notification (step S250) when the determination result is YES, and returns to the process in step S200 to continue the monitoring processing.

Further, if the determination result in step S241 is NO, that is, if the calculated frequency of the transfer notification is equal to or less than the predetermined threshold, the transfer notification permission instruction is output to the transfer notification unit 27 to permit the transfer notification (step S242), and the processing returns to the process in step S200 to continue the monitoring processing.

Effects of the present embodiment configured as described above will be described in more detail with reference to a comparative example.

Figure 4:
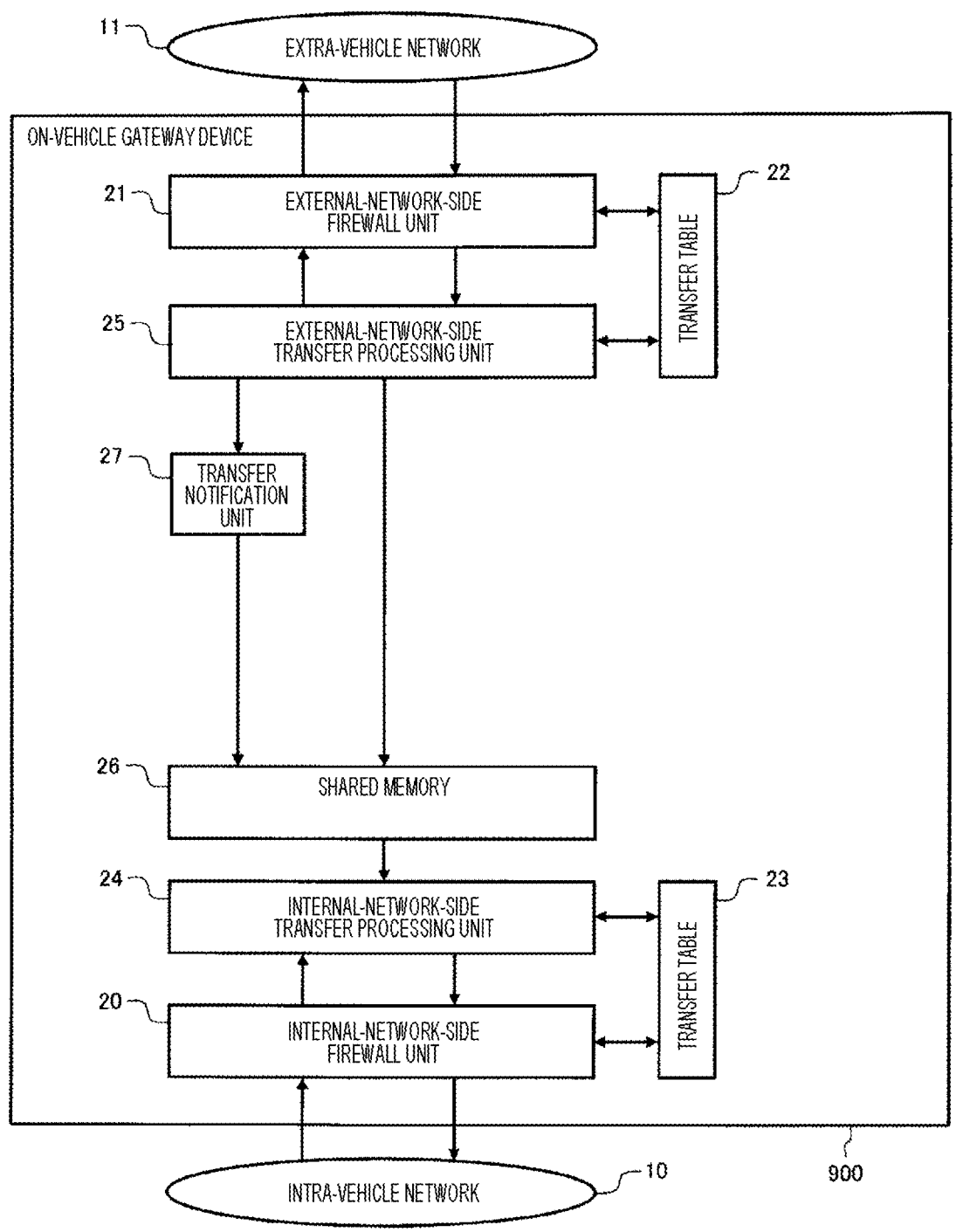
FIG. 4 is a functional block diagram schematically illustrating functions of an on-vehicle gateway device according to a comparative example.

FIG. 4 is a functional block diagram schematically illustrating functions of an on-vehicle gateway device according to a comparative example. Further, FIG. 5 is a flowchart illustrating a processing content related to monitoring processing of the on-vehicle gateway device according to the comparative example.

In FIG. 4, an on-vehicle gateway device 900 is configured to perform communication connection between an intra-vehicle network 10 (internal network) of a device mounted on a vehicle and an extra-vehicle network 11 (external network), and includes: an external-network-side firewall unit 21 that determines whether a communication frame to be exchanged with the extra-vehicle network 11 is a communication frame to be transmitted or received to or from the extra-vehicle network 11, that is, a communication frame to be passed, based on identification information included in the communication frame and a predetermined transfer table 22, and performs processing to allow passage only when the communication frame is determined to be the communication frame to be transmitted or received; an external-network-side transfer processing unit that transfers a communication frame, which has passed through the external-network-side firewall unit 21 from the extra-vehicle network 11, to a predetermined transfer destination based on identification information included in the communication frame and the transfer table 22; an internal-network-side firewall unit 20 that determines whether or not a communication frame to be exchanged with the intra-vehicle network 10 is a communication frame to be transmitted or received to or from the intra-vehicle network 10, that is, a communication frame to be passed, based on identification information included in the communication frame and a predetermined transfer table 23, and performs processing to allow passage only when the communication frame is determined to be the communication frame to be transmitted or received; an internal-network-side transfer processing unit 24 that transfers a communication frame, which has passed through the internal-network-side firewall unit 20 from the intra-vehicle network 10, to a predetermined transfer destination based on identification information included in the communication frame and the transfer table 23; a shared memory 26 that temporarily stores a communication frame transferred from the external-network-side transfer processing unit 25 to the internal-network-side transfer processing unit 24; and a transfer notification unit 27 that gives a transfer notification to notify the shared memory 26 that there is a communication frame transferred from the external-network-side transfer processing unit 25 to the shared memory 26 based on information from the external-network-side transfer processing unit 25.

The transfer processing of the on-vehicle gateway device according to the comparative example will be described.

Figure 5:
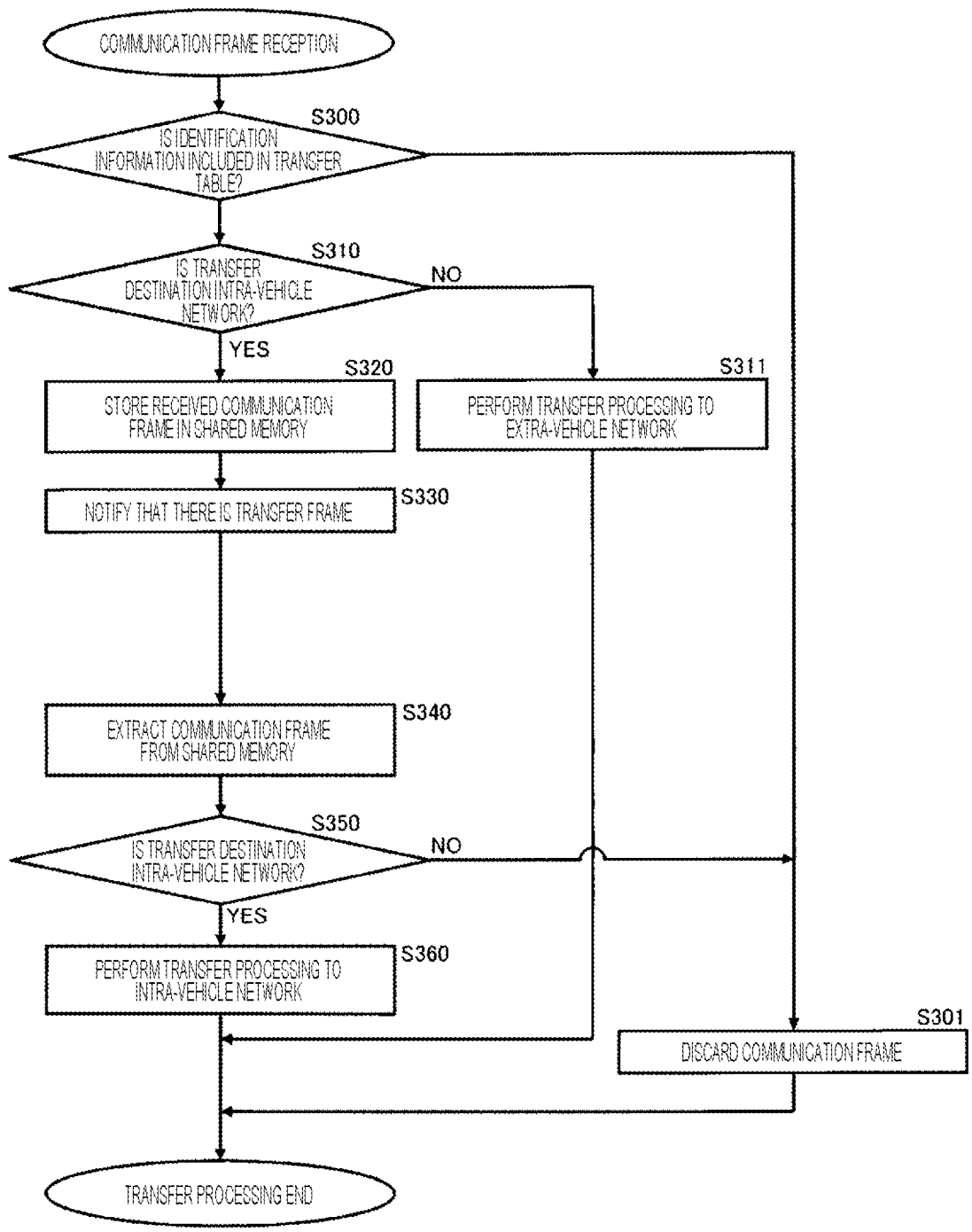
FIG. 5 is a flowchart illustrating a processing content related to monitoring processing of the on-vehicle gateway device according to the comparative example.

In FIG. 5, when receiving a communication frame addressed to the intra-vehicle network 10 from the extra-vehicle network 11 via the external-network-side firewall unit 21, the external-network-side transfer processing unit 25 of the on-vehicle gateway device collates identification information of the communication frame with information of the transfer table 23, and determines whether the corresponding identification information is included in the transfer table (step S300). If the determination result in step S300 is NO, the communication frame is determined not to be a communication frame to be received and is discarded (step S301), and the transfer processing is ended.

If the determination result in step S300 is YES, it is determined whether a transfer destination defined in the transfer table 23 is the intra-vehicle network 10 (step S310). If the determination result is NO, that is, if the transfer destination is the extra-vehicle network 11, transfer processing to the extra-vehicle network 11 is performed (step S311), and the transfer processing is ended.

If the determination result in step S310 is YES, that is, if the transfer destination is the intra-vehicle network 10, the communication frame is transferred to and stored in the shared memory 26 (step S320), and the transfer notification unit 27 is notified of information indicating that there is a transfer frame stored in the shared memory 26 (step S330).

Subsequently, the transfer notification unit 27 gives a transfer notification to the shared memory 26, and the internal-network-side transfer processing unit 24 extracts the communication frame from the shared memory 26 (step S340).

Subsequently, the internal-network-side transfer processing unit 24 collates identification information of the extracted communication frame with the transfer table 22, determines whether a transfer destination defined in the transfer table 22 is the intra-vehicle network 10 (step S350), determines that the communication frame is not a communication frame to be received and discards the communication frame if the determination result is NO (step S301), and ends the transfer processing.

If the determination result in step S350 is YES, that is, if the transfer destination is the intra-vehicle network 10, transfer processing to the intra-vehicle network 10 is performed (step S360), and the transfer processing is ended.

In the on-vehicle gateway device according to the comparative example configured as described above, the communication frame is transferred to the intra-vehicle network 10 regardless of the authenticity of the communication frame if the identification information of the communication frame received from the extra-vehicle network 11 is defined in the transfer table 23. That is, there is a problem that the communication of the intra-vehicle network 10 is disturbed when a large number of communication frames are transmitted from the extra-vehicle network 11 to the intra-vehicle network 10 due to a cyber security attack that infringes availability, such as a Denial of Service (DoS) attack.

In the present embodiment, however, the transfer notification from the transfer notification unit 27 is permitted by the transfer data amount monitoring unit 31 and the transfer notification frequency monitoring unit 32 when the calculated sum or average value of transfer data amounts and the calculated frequency of the transfer notification do not exceed the predetermined thresholds, respectively. That is, in a case where a large number of communication frames are transmitted from the extra-vehicle network 11 to the intra-vehicle network 10 due to a cyber security attack that infringes availability such as a DoS attack, the thresholds have been defined in advance with respect to the transfer data amount and the frequency of the transfer notification, and the transfer notification is prohibited if transfer exceeding the thresholds is performed, so that it is possible to prevent interference of the communication with the intra-vehicle network 10.

Second Embodiment

A second embodiment of the present invention will be described with reference to FIGS. 6 and 7.

The present embodiment is configured to monitor only a communication frame satisfying a specific condition among communication frames transferred from an extra-vehicle network side to an intra-vehicle network side.

Figure 6:
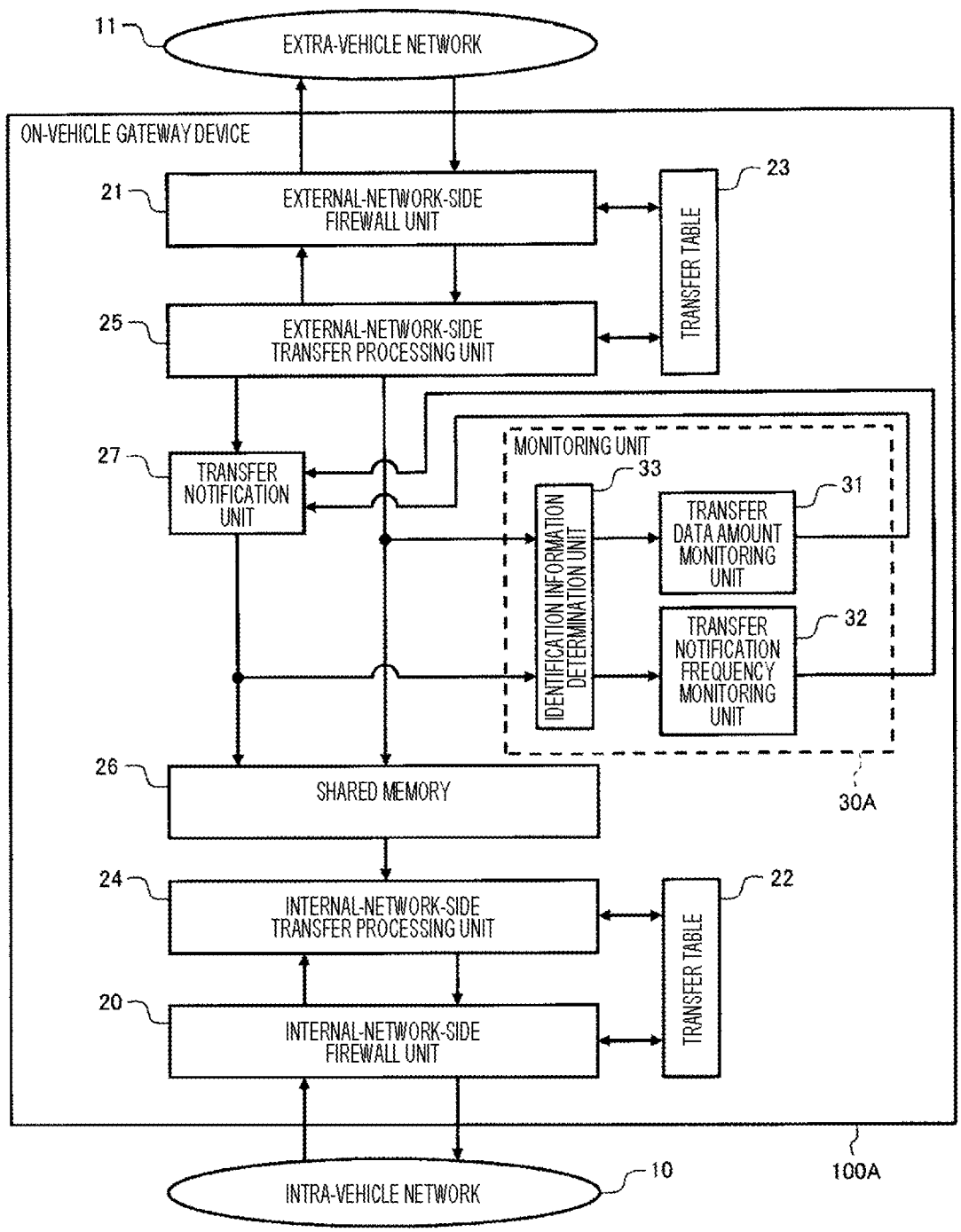
FIG. 6 is a functional block diagram schematically illustrating functions of an on-vehicle gateway device according to a second embodiment.

FIG. 6 is a functional block diagram schematically illustrating functions of an on-vehicle gateway device according to the present embodiment. Further, FIG. 7 is a flowchart illustrating a processing content related to monitoring processing of the on-vehicle gateway device. In the drawings, the same configurations as those of the first embodiment will be denoted by the same reference signs, and the description thereof will be omitted.

In FIG. 6, an on-vehicle gateway device 100A is configured to perform communication connection between the intra-vehicle network 10 (internal network) of a device mounted on a vehicle and the extra-vehicle network 11 (external network), and includes the external-network-side firewall unit 21, the transfer table 23, the external-network-side transfer processing unit 25, the internal-network-side firewall unit 20, the transfer table 22, the internal-network-side transfer processing unit 24, the shared memory 26, the transfer notification unit 27, and a monitoring unit 30A that determines whether to transfer a communication frame from the external-network-side transfer processing unit 25 to the internal-network-side transfer processing unit 24 via the shared memory 26 based on at least one of a frequency of the transfer notification from the transfer notification unit 27 to the shared memory 26 and a data amount of the communication frame transferred from the external-network-side transfer processing unit 25 to the shared memory 26.

The monitoring unit 30A includes: the transfer data amount monitoring unit 31 that monitors the data amount of the communication frame transferred from the externalnetwork-side transfer processing unit 25 to the shared memory 26 and stored; the transfer notification frequency monitoring unit 32 that monitors the frequency of the transfer notification from the transfer notification unit 27 to the shared memory 26; and an identification information determination unit 33 that performs control such that only information of a communication frame having identification information determined in advance as a monitoring target is input to the transfer data amount monitoring unit 31 and the transfer notification frequency monitoring unit 32.

The identification information determination unit 33 acquires identification information of a communication frame transferred from the external-network-side transfer processing unit 25 to the shared memory 26 and stored, and identification information of a transfer notification from the transfer notification unit 27 to the shared memory 26, and determines whether the communication frame has the identification information as the monitoring target. Then, among communication frames transferred from the external-network-side transfer processing unit 25 to the shared memory 26 and stored, the identification information determination unit 33 transmits only information of a communication frame whose identification information is determined in advance as the monitoring target to the transfer data amount monitoring unit 31. That is, the transfer data amount monitoring unit 31 monitors only a transfer data amount of the communication frame to be identified. Similarly, among transfer notifications from the transfer notification unit 27 to the shared memory 26, the identification information determination unit 33 transmits only information of a communication frame whose identification information is determined in advance as the monitoring target to the transfer notification frequency monitoring unit 32. That is, the transfer notification frequency monitoring unit 32 monitors only a transfer frequency of the communication frame to be identified.

Figure 7:
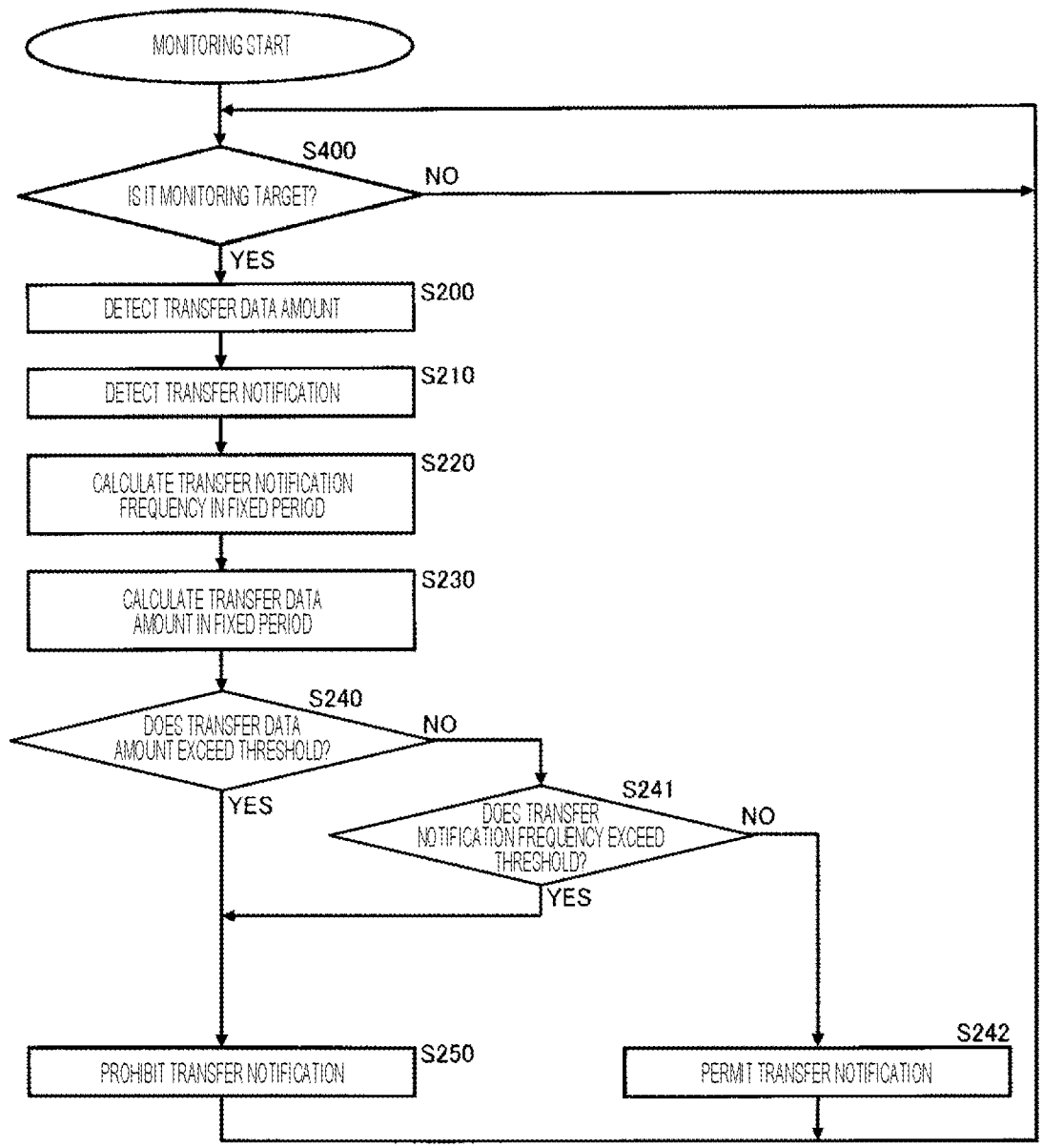
FIG. 7 is a flowchart illustrating a processing content related to monitoring processing of the on-vehicle gateway device according to the second embodiment.

In FIG. 7, the identification information determination unit 33 of the monitoring unit 30A acquires identification information of a communication frame transferred from the external-network-side transfer processing unit 25 to the shared memory 26 and stored, and identification information of a transfer notification from the transfer notification unit to the shared memory 26, and determines whether the communication frame has the identification information as the monitoring target (step S400). If the determination result in step S400 is NO, the processing returns to the process in step S400 to continue the monitoring processing.

If the determination result in step S400 is YES, that is, if the communication frame has the identification information as the monitoring target, the transfer data amount monitoring unit 31 of the monitoring unit 30A detects a data amount of the communication frame transferred from the external-network-side transfer processing unit 25 to the shared memory 26 and stored (step S200), and calculates a sum or an average value of data amounts of the communication frames transferred in a fixed period (step S210).

Subsequently, the transfer notification frequency monitoring unit 32 of the monitoring unit 30A detects a transfer notification from the transfer notification unit 27 (step S220), and calculates the frequency of the transfer notification in a fixed period (step S230).

Subsequently, the transfer data amount monitoring unit 31 determines whether the calculated sum or average value of transfer data amounts is greater than (exceeds) a predetermined threshold (step S240), outputs a transfer notification prohibition instruction to the transfer notification unit 27 to prohibit the transfer notification (step S250) when the determination result is YES, and returns to the process in step S400 to continue the monitoring processing.

In addition, if the determination result in step S240 is NO, that is, if the calculated sum or average value of transfer data amounts is equal to or less than the predetermined threshold, the transfer notification frequency monitoring unit 32 determines whether the calculated frequency of the transfer notification is greater than (exceeds) a predetermined threshold (step S241), and outputs the transfer notification prohibition instruction to the transfer notification unit 27 to prohibit the transfer notification (step S250) when the determination result is YES, and returns to the process in step S400 to continue the monitoring processing.

Further, if the determination result in step S241 is NO, that is, if the calculated frequency of the transfer notification is equal to or less than the predetermined threshold, a transfer notification permission instruction is output to the transfer notification unit 27 to permit the transfer notification (step S242), and the processing returns to the process in step S400 to continue the monitoring processing.

The other configurations are similar to those of the first embodiment.

Even in the present embodiment configured as described above, the same effects as those of the first embodiment can be obtained.

Further, only the communication frame as the monitoring target determined in advance can be monitored, and thus, interference of the communication with the intra-vehicle network 10 can be more accurately prevented.

Third Embodiment

A third embodiment of the present invention will be described with reference to FIG. 8.

The present embodiment is configured such that a transfer notification is permitted when a transfer data amount and a frequency of the transfer notification are less than predetermined thresholds (permission thresholds), respectively, as well as the transfer notification is prohibited when the transfer data amount and the frequency of the transfer notification exceed predetermined thresholds (prohibition thresholds), respectively.

Figure 8:
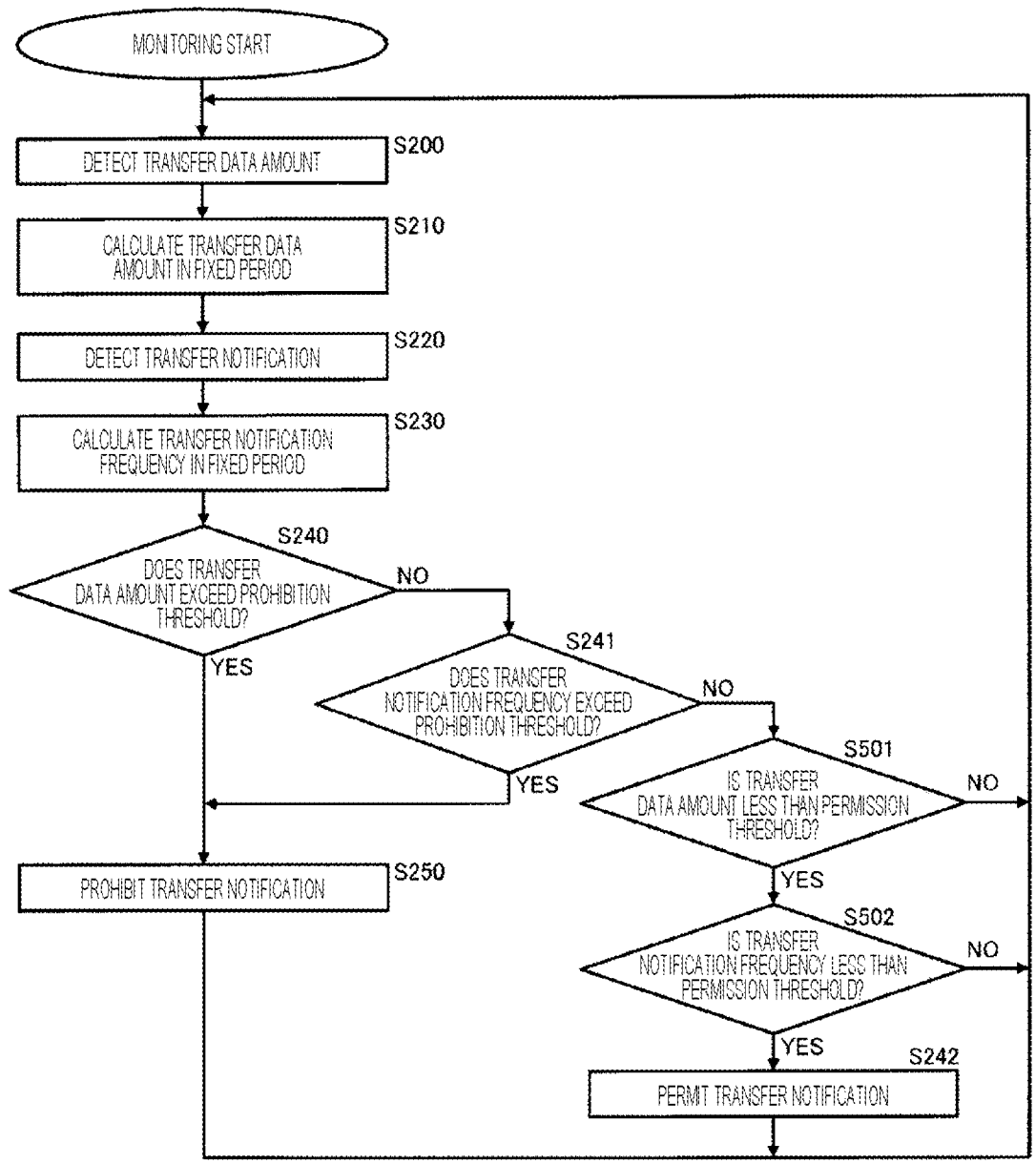
FIG. 8 is a flowchart illustrating a processing content related to monitoring processing of an on-vehicle gateway device according to a third embodiment.

FIG. 8 is a flowchart illustrating a processing content related to monitoring processing of an on-vehicle gateway device according to the present embodiment. In the drawings, the same configurations as those of the first embodiment will be denoted by the same reference signs, and the description thereof will be omitted.

In FIG. 8, the transfer data amount monitoring unit 31 of the monitoring unit 30 detects a data amount of a communication frame transferred from the external-network-side transfer processing unit 25 to the shared memory 26 and stored (step S200), and calculates a sum or an average value of data amounts of the communication frames transferred in a fixed period (step S210).

Subsequently, the transfer notification frequency monitoring unit 32 of the monitoring unit 30 detects a transfer notification from the transfer notification unit 27 (step S220), and calculates the frequency of the transfer notification in a fixed period (step S230).

Subsequently, the transfer data amount monitoring unit 31 determines whether the calculated sum or average value of transfer data amounts is greater than (exceeds) a predetermined prohibition threshold (step S240), outputs a transfer notification prohibition instruction to the transfer notification unit 27 to prohibit the transfer notification (step S250)

when the determination result is YES, and returns to the process in step S200 to continue the monitoring processing.

In addition, if the determination result in step S240 is NO, that is, if the calculated sum or average value of transfer data amounts is equal to or less than the predetermined prohibition threshold, the transfer notification frequency monitoring unit 32 determines whether the calculated frequency of the transfer notification is greater than (exceeds) a predetermined prohibition threshold (step S241), and outputs the transfer notification prohibition instruction to the transfer notification unit 27 to prohibit the transfer notification (step S250) when the determination result is YES, and returns to the process in step S200 to continue the monitoring processing.

Further, if the determination result in step S241 is NO, that is, if the calculated frequency of the transfer notification is equal to or less than the predetermined prohibition threshold, the transfer data amount monitoring unit 31 determines whether the calculated sum or average value of transfer data amounts is less than a predetermined permission threshold (step S501). If the determination result is YES, the transfer notification frequency monitoring unit 32 further determines whether the calculated frequency of the transfer notification is less than a predetermined permission threshold (step S502).

When the determination results in both the steps S501 and S502 are YES, a transfer notification permission instruction is output to the transfer notification unit 27 to permit the transfer notification (step S242), and the processing returns to the process in step S200 to continue the monitoring processing. Further, if the determination result in at least one of steps S501 and S502 is NO, the processing returns to the process in step S200 to continue the monitoring processing.

The other configurations are similar to those of the first embodiment.

Even in the present embodiment configured as described above, the same effects as those of the first embodiment can be obtained.

Further, hysteresis can be obtained between prohibition and permission of the transfer notification, and thus, it is possible to return from prohibition to permission after waiting for a state of the communication frame transferred from the extra-vehicle network to the intra-vehicle network to be stabilized to a normal state.

Fourth Embodiment

A fourth embodiment of the present invention will be described with reference to FIG. 9.

The present embodiment corresponds to a case where processing of each unit of an on-vehicle gateway device is implemented by a plurality of central processing units (CPUs).

Figure 9:
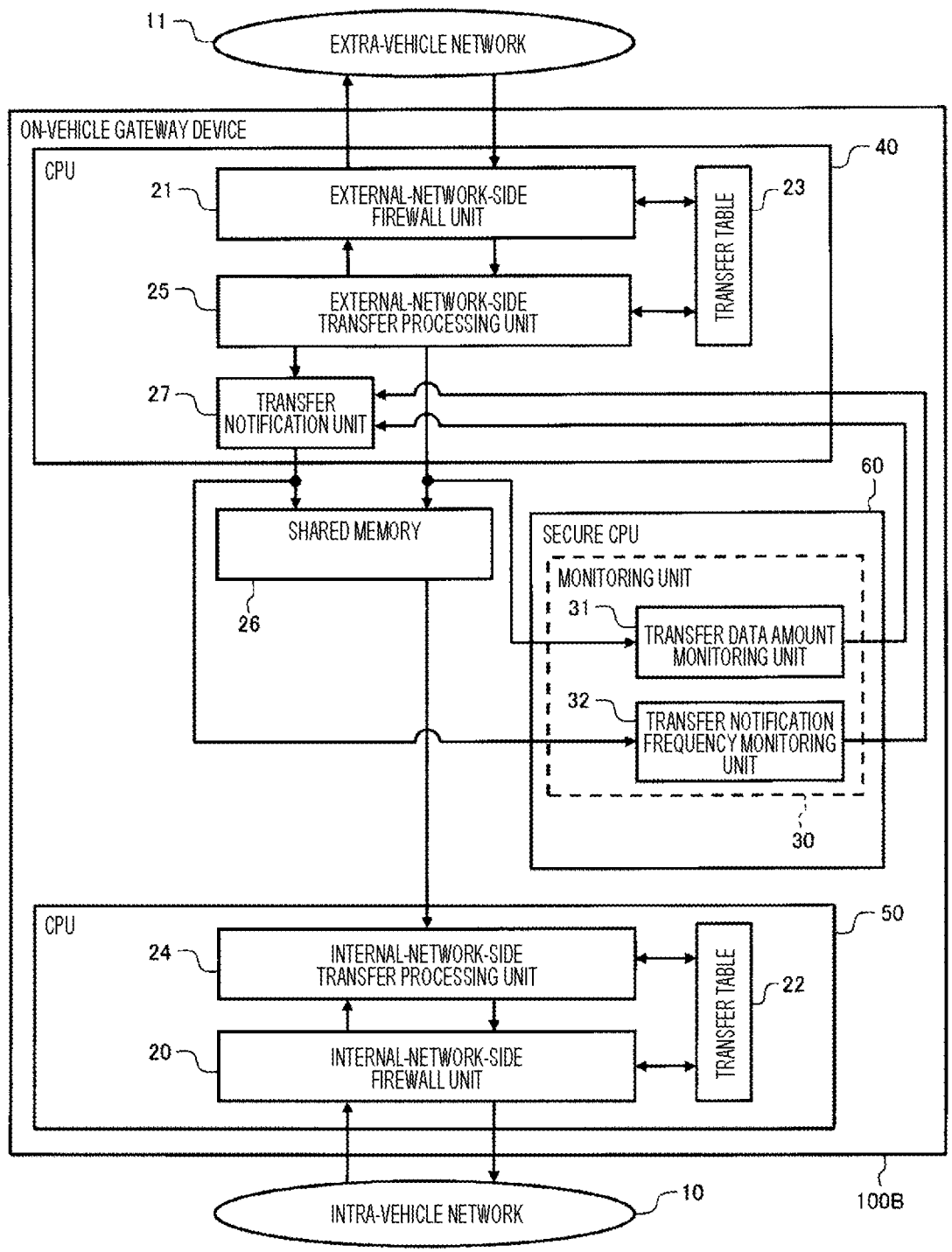
FIG. 9 is a functional block diagram schematically illustrating functions of an on-vehicle gateway device according to a fourth embodiment.

FIG. 9 is a functional block diagram schematically illustrating functions of the on-vehicle gateway device according to the present embodiment. In the drawings, the same configurations as those of the first embodiment will be denoted by the same reference signs, and the description thereof will be omitted.

In FIG. 6, an on-vehicle gateway device 100B is configured to perform communication connection between the intra-vehicle network 10 (internal network) of a device mounted on a vehicle and the extra-vehicle network 11 (external network), and includes the shared memory 26, a CPU 40, a CPU 50, and a secure CPU 60 with higher safety.

The CPU 40 implements the respective functions of the external-network-side firewall unit 21, the transfer table 23, the external-network-side transfer processing unit 25, and the transfer notification unit 27.

The CPU 50 implements the respective functions of the internal-network-side firewall unit 20, the transfer table 22, and the internal-network-side transfer processing unit 24.

The secure CPU 60 implements the functions of the monitoring unit 30 including the transfer data amount monitoring unit 31 and the transfer notification frequency monitoring unit 32.

The other configurations are similar to those of the first embodiment.

Even in the present embodiment configured as described above, the same effects as those of the first embodiment can be obtained.

In addition, a processing load can be distributed by sharing the processing among the CPU 40, the CPU 50, and the secure CPU 60. Since the monitoring unit 30 is implemented by the secure CPU, it is possible to eliminate the influence related to processing of a large number of communication frames transmitted from the extra-vehicle network such as a DoS attack, and it is possible to safely perform the processing of the monitoring unit 30.

<Appended Note>

Note that the present invention is not limited to the above embodiments, and includes various modifications and combinations within a scope not departing from a gist of the present invention. Further, the present invention is not limited to one having all the configurations described in the above embodiments, but also includes one in which some of the configurations are deleted.

For example, the configuration including the transfer data amount monitoring unit and the transfer notification frequency monitoring unit has been described as an example in the above embodiments, but the present invention is not limited thereto, and similar processing may be performed with a configuration using either one.

Further, the case where the present invention is applied to the on-vehicle gateway device has been described as an example in the above embodiments, but the present invention is not limited thereto, and can also be applied to, for example, a production system of a manufacturing factory, a mobile object other than a vehicle, and a gateway device such as a robot.

Further, a part or all of each of the above-described configurations, functions, and the like may be implemented, for example, by designing with an integrated circuit and the like. Further, the above-described respective configurations, functions and the like may be implemented by software by the processor interpreting and executing a program for implementing the respective functions.

REFERENCE SIGNS LIST 10 intra-vehicle network
11 extra-vehicle network
20 internal-network-side firewall unit
21 external-network-side firewall unit
22, 23 transfer table
24 internal-network-side transfer processing unit
25 external-network-side transfer processing unit
26 shared memory
27 transfer notification unit
30, 30A monitoring unit
31 transfer data amount monitoring unit
32 transfer notification frequency monitoring unit
33 identification information determination unit
100, 100A, 100B on-vehicle gateway device
900 on-vehicle gateway device (comparative example)

The invention claimed is:

1. A gateway device that performs communication connection between an internal network of a device and an external network, the gateway device comprising:
   at least one central processing unit (CPU) comprising:
   an external-network-side transfer processor configured to transfer a communication frame received from the external network to the internal network;
   an internal-network-side transfer processor configured to transfer the communication frame transferred from the external network via the external-network-side transfer processor to the internal network, wherein the communication frame is temporarily stored in a shared memory on the internal network in response to the transfer of the communication frame from the external network via the external-network-side transfer processor to the shared memory;
   a transfer notifier configured to provide a transfer notification to notify the shared memory of the transfer of the communication frame from the external-network-side transfer processor to the shared memory, wherein the communication frame is stored in the shared memory prior to the transfer of the communication frame to the internal-network-side transfer processor processing unit;
   an external-network-side firewall configured to filter the communication frame received from the external network and to be transferred to the external-network-side transfer processor, wherein the external-network-side firewall performs filtering based on identification information of the communication frame and a first transfer table;
   an internal-network-side firewall configured to determine whether to transfer the communication frame received from the external-network-side transfer processor to the internal-network-side transfer processor, wherein the internal network-side firewall performs filtering based on the identification information of the communication frame and a second transfer table; and
   a monitor configured to determine whether to transfer the communication frame from external-network-side transfer processor to the internal-network-side transfer processor via the shared memory based on at least one of a frequency of the transfer notification from the transfer notifier to the shared memory and a transfer data amount of communication frames transferred between the external-network-side transfer processor and the shared memory,
   wherein only for a communication frame of a predetermined type among a plurality of communication frames transferred from the external-network-side transfer processor to the shared memory, the monitor determines whether to transfer the communication frame, and
   wherein the communication frame of the predetermined type has identification information determined in advance to correspond to a monitoring target.

2. The gateway device according to claim 1, wherein the monitor prohibits the transfer notification from the transfer notifier when the frequency of the notification from the transfer to the shared memory is greater than a predetermined threshold.

3. The gateway device according to claim 1, wherein the monitor prohibits the transfer notification from the transfer notifier when the transfer data amount of the communication frames transferred from the external-network-side transfer processor to the shared memory is greater than a predetermined threshold.

4. The gateway device according to claim 1, wherein the monitor permits the transfer notification from the transfer notifier when the frequency of the transfer notification from the transfer notifier to the shared memory is less than a predetermined threshold and the transfer data amount of the communication frames transferred from the external-network-side transfer processor to the shared memory is less than a predetermined threshold.

5. The gateway device according to claim 1, wherein
   processing of the monitor is performed by a secure processor of an integrated circuit of the at least one CPU.

* * * * *